April 29, 1941.      R. E. DAVIS      2,239,882

CONTROL FOR HYDRODYNAMIC MACHINES

Filed Aug. 18, 1939

INVENTOR.
RICHARD E. DAVIS
BY
ATTORNEY.

Patented Apr. 29, 1941

2,239,882

UNITED STATES PATENT OFFICE 2,239,882

CONTROL FOR HYDRODYNAMIC MACHINES

Richard E. Davis, Milwaukee, Wis., assignor to The Oilgear Company, Milwaukee, Wis., a corporation of Wisconsin Application August 18, 1939, Serial No. 290,742

18 Claims. (Cl. 103—37)

This invention relates to controls for hydrodynamic machines of the type which function as pumps when driven from a source of power and function as motors when supplied with motive liquid.

In certain types of machines which are driven by rotary hydrodynamic motors, it is desirable that the motor operate first at one speed for a predetermined period of time and then operate at a different speed. In operating certain types of hydraulically operated machines, it is advantageous to supply motive liquid thereto first at one rate and then at a higher rate and this is particularly true of machines of the type having two slides or carriages which are operated in sequence by hydraulic motors and the motor for operating the first slide is smaller than the motor for operating the second slide.

The present invention has as an object to provide a hydrodynamic machine with a control which will automatically cause the machine when functioning as a pump to deliver liquid at a predetermined rate during a predetermined period of time and then increase the rate to a predetermined maximum or, when functioning as a motor, to operate at a given speed during a given period of time and then increase the speed to a predetermined maximum.

Another object is to provide a control of the above character which will cause a hydrodynamic machine to deliver liquid in either direction first at one rate and then at another rate when functioning as a pump or to operate in either direction first at one speed and then at another speed when functioning as a motor.

Other and more specific objects and advantages will appear from the description hereinafter given of a control in which the invention is embodied.

According to the invention in its general aspect and as ordinarily embodied in practice, a hydrodynamic machine is provided with means for rapidly increasing its displacement a predetermined amount, then maintaining the displacement nearly constant for a brief period of time and then rapidly increasing in displacement to a predetermined maximum.

According to the invention in another aspect, the displacement varying member of a hydrodynamic machine is rapidly shifted a predetermined distance in either direction from its neutral position, then moved very slowly for a brief period of time and then rapidly shifted to a predetermined limit.

Since the function of a pump and the function of a motor are substantially opposite to each other, the invention will be explained as applied to a hydrodynamic machine which is to function as a pump but it is to be understood that the invention is equally applicable to a motor and that the term "pump" as used herein is intended to cover either a pump or a motor or a hydrodynamic machine which may function as either a pump or a motor.

The invention is exemplified by the apparatus shown somewhat schematically in the accompanying drawing in which the views are as follows.

Figure 1:
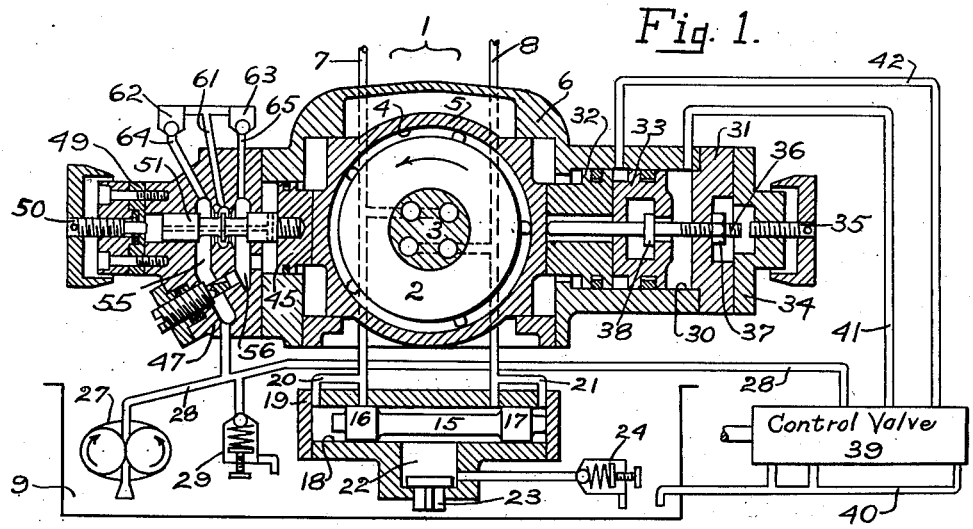
Fig. 1 is in part a transverse section through a pump to which the invention has been applied and in part a diagram of the hydraulic circuit, the control mechanism being greatly enlarged relative to the pump and the parts shown in the positions occupied when the displacement of the pump is zero.

For the purpose of illustration, the invention has been shown as being applied to a pump I of the rolling piston type but it is equally applicable to other types of pumps and motors. Since a pump of the rolling piston type is fully illustrated and described in Patent No. 2,074,068, the pump has not been shown in detail. It is deemed sufficient to state herein that pump I has its pistons and cylinders arranged radially in a cylinder barrel 2 which rotates upon a stationary valve shaft or pintle 3 having formed therein ports and passages through which liquid flows to and from the cylinders, that the outer ends of the pistons react against an annular reaction surface 4 which in practice is formed in a separate rotatable thrust member carried by a slide block 5 but which has been shown as being formed in slide block 5, that pump I will discharge liquid in a direction and at a rate depending upon the direction and the distance the axis of reaction surface 4 is offset from the axis of cylinder barrel 2, and that slide block 5 is arranged in a casing 6 which permits it to be moved transversely of pintle 3 but prevents it from moving in any other direction.

Pump 1 is adapted to deliver liquid to and receive liquid from an external circuit through two channels 7 and 8 which communicate with the passages in pintle 3, the direction and rate of flow being determined by the direction and distance slide block 5 is moved from its neutral position.

In order that pump 1 may be supplied with liquid to compensate for leakage losses and in order to compensate for the difference in the volume delivered by pump 1 and the volume returned thereto from an external circuit having differential motors connected therein, means are provided to permit liquid returned to pump 1 in excess of pump requirements to be discharged into a reservoir 9 and, when the volume returned to the pump is less than pump requirements, to permit the pump to draw the required additional liquid from reservoir 9.

As shown, communication between pump 1 and reservoir 9 is controlled by an automatic valve 15 having two spaced apart heads or pistons 16 and 17 arranged thereon and closely fitted in a bore 18 formed in a valve casing 19 which is arranged below slide block 5 and has a part thereof extending into the liquid in reservoir 9.

Pistons 16 and 17 control communication between bore 18 and the lower ends of channels 7 and 8 which are connected to bore 18 at points spaced from opposite ends thereof. The extreme left end of bore 18 is connected by a channel 20 to channel 7 intermediate the ends thereof and the extreme right end of bore 18 is connected by a channel 21 to channel 8 intermediate the ends thereof.

That part of bore 18 between channels 7 and 8 communicates with a chamber 22 formed in the lower part of valve casing 19 and communicating with reservoir 9 through a check valve 23 which permits pump 1 to draw liquid freely from reservoir 9 but prevents liquid from being expelled from chamber 22 except through a low pressure relief valve 24 having its inlet connected to chamber 22.

The arrangement is such that, when pump 1 starts to deliver liquid into channel 8, pressure extends from channel 8 through channel 21 to the right end of bore 18 and shifts valve 15 toward the left so that channel 8 is blocked by piston 17 and channel 7 is opened to chamber 22 through bore 18 and, when pump 1 starts to deliver liquid into channel 7, pressure extends from channel 7 through channel 20 to the left end of bore 18 and shifts valve 15 toward the right to the position shown so that channel 7 is blocked by piston 16 and channel 8 is opened to chamber 22 through bore 18.

Valve 15 thus operates to automatically block the pressure side of the pump from chamber 22 and to open the return side of the pump to chamber 22 in either direction of pump delivery so that pump 1 can at no time discharge freely into reservoir 9, liquid returned to the pump in excess of pump requirements can at all times be discharged through channel 7 or 8, bore 18, chamber 22 and relief valve 24 into reservoir 9, and any deficiency in the liquid returned to the pump from an external circuit can be made up by liquid drawn by pump 1 through check valve 23.

Pump 1 is caused to deliver liquid in one direction or the other by shifting slide block 5 in one direction or the other from a central or neutral position. This is accomplished by hydraulically actuated means operated by liquid supplied thereto by a gear pump 27 which draws liquid from reservoir 9 and discharges it into a low pressure supply channel 28, the liquid discharged by gear pump 27 in excess of requirements being exhausted through a low pressure relief valve 29 which discharges into reservoir 9 and enables gear pump 27 to maintain a uniform pressure in channel 28.

Slide block 5 is adapted to be moved toward the left by a compound servo-motor consisting of a cylinder 30 which is fixed to pump casing 6 and provided at its outer end with an end head 31, a piston 32 which is fitted in cylinder 30 and abuts or is connected to slide block 5, and a piston 33 which is fitted in cylinder 30 between piston 32 and end head 31. The outer end of cylinder 30 is sealed by a cap 34 which is fixed to head 31 and has an adjusting screw 35 threaded therethrough to limit the movement of slide block 5 toward the right.

Adjusting screw 35 coacts with a stop rod 36 which extends loosely through head 31 and pistons 32 and 33 so that its left end may be engaged by slide block 5. Stop rod 36 has a nut 37 threaded thereon and arranged in a suitable recess formed in head 31, and it has a collar 38 fixed thereon and arranged in a suitable recess formed within piston 33.

Liquid for operating servo-motor 30—33 is supplied thereto by gear pump 27 under the control of a valve 39 which has a branch of supply channel 28 connected thereto and is adapted to permit liquid to escape from cylinder 30 into a drain channel 40 which discharges into reservoir 9. Control valve 39 has one of its ports connected by a channel 41 to cylinder 30 at or near the outer end thereof and another of its ports connected by a channel 42 to cylinder 30 at a point between pistons 32 and 33.

The arrangement is such that, when control valve 39 is shifted to one of its three positions, it connects channels 41 and 42 to drain channel 40 and permits mechanism to be presently described to shift slide block 5 toward the right to thereby cause pump 1 to discharge liquid into channel 7. Slide block 5 will move rod 36 toward the right until it engages adjusting screw 35 which arrests further movement of slide block 5 and thereby limits the displacement of pump 1 and the rate at which liquid is delivered into channel 7.

When control valve 39 is shifted to its neutral position, it connects channel 41 to supply channel 28 and connects channel 42 to drain channel 40 so that liquid from gear pump 27 may flow through channel 28, valve 39 and channel 41 to the outer end of cylinder 30 and cause piston 33 to move slide block 5 toward the left. Piston 33 will engage collar 38 and move stop rod 36 toward the left until further movement thereof is arrested by nut 37 which is adjusted to stop rod 36 and piston 33 when slide block 5 reaches its central or neutral position at which time pump 1 ceases to deliver liquid.

When control valve 39 is shifted to its third position, it connects both of channels 41 and 42 to supply channel 28 so that both faces of piston 33 are subjected to gear pump pressure and liquid may flow through channel 42 and cause piston 32 to shift slide block 5 toward the left until further movement thereof is arrested by a stop to be presently described. Shifting slide block 5 toward the left from its neutral position causes pump 1 to deliver liquid into channel 8.

Figure 2:
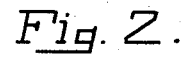
Fig. 2 is an enlarged view of that part of the control mechanism in which the invention primarily resides, the valve being shown in the position occupied when the pump is delivering liquid at a predetermined maximum rate in one direction.

The mechanism for moving slide block 5 toward the right is best shown in Fig. 2. As shown, slide block 5 is continuously urged toward the right by gear pump liquid acting upon a piston 45 which abuts or is connected to slide block 5 and fitted in a cylinder 46 carried by pump casing 6. Cylinder 46 is closed at its outer end by a valve block 47 which has a central bore 48 formed therein and closed at its outer end by a cap 49 having an adjusting screw 50 arranged therein.

Bore 48 has fitted therein a valve 51 which is attached to piston 45 to move therewith and has a passage 52 extending therethrough to provide communication between cylinder 46 and the left end of bore 48 so that liquid may flow therebetween when valve 51 moves in one direction or the other. Valve 51 is reduced in diameter intermediate its ends to form a very narrow piston 53 at or near its center.

Bore 48 has an annular groove or port 54 formed in the wall thereof between two ports 55 and 56 which are formed in valve block 47 and extend around bore 48 so as to leave two very narrow lands 57 and 58 upon opposite sides of port 54. Piston 53 coacts with lands 57 and 58 to momentarily stop the flow of liquid through bore 54 and thereby momentarily arrest the movement of slide block 5 in one direction or the other from its neutral position as will presently appear.

Port 55 has a branch of channel 28 connected thereto. Port 56 communicates with cylinder 46 and is connected to port 55 through a passage 59 having an adjustable throttle valve 60 arranged therein to limit the rate of liquid flow therethrough. The arrangement is such that pressure created by gear pump 27 extends through channel 28, port 55, bore 48 and port 56 to cylinder 46 and causes piston 45 to continuously urge slide block 5 toward the right. However, piston 45 is considerably smaller than pistons 32 and 33 so that it cannot move slide block 5 toward the right until cylinder 30 is opened to drain, and servo-motor 32—33 when energized may readily move slide block 5 toward the left against the resistance of piston 45.

In order that slide block 5 may be returned rapidly to its neutral position, port 54 is connected by a channel 61 to the inlets of two check valves 62 and 63 the outlets of which are connected, respectively, by channels 64 and 65 to ports 55 and 56. If it is desired that the movement of slide block 5 toward its neutral position be momentarily arrested, channels 61, 64 and 65 and check valves 62 and 63 are omitted.

*Operation*

Assuming that pumps 1 and 27 are running and that valve 39 is in its neutral position so that slide block 5 is in its neutral position, the control will function as follows:

When valve 39 is shifted to a position to connect channel 42 to channel 28, liquid from gear pump 27 will flow therethrough to cylinder 30 and cause piston 32 to shift slide block 5 toward the left and piston 45 to expel liquid from cylinder 46. Slide block 5 will move at a very high rate of speed and liquid will flow freely from cylinder 46 through port 56, bore 48 and port 55 into channel 28 until valve piston 53 blocks the flow of liquid through bore 48 by moving into alignment with land 57 as shown in Fig. 3.

The liquid expelled from cylinder 46 must then flow through passage 59 at a very low rate as determined by the adjustment of throttle valve 60 so that slide block 5 must move very slowly until valve piston 53 moves out of alignment with land 57 and permits liquid to again flow freely through bore 48 as shown in Fig. 2. Then slide block 5 will move at a very high speed until valve 51 engages adjusting screw 50 which is adjusted to stop slide block 5 when the rate at which pump 1 is discharging liquid into channel 8 reaches a predetermined maximum.

Figure 3:
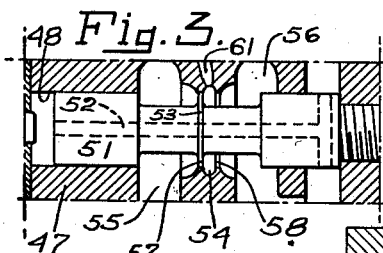
Fig. 3 is a view of a part of the mechanism shown in Fig. 2 but shows the valve in a position intermediate the positions shown in Figs. 1 and 2.

When slide block 5 is at the limit of its movement toward the left as indicated by the position of valve 51 in Fig. 2 and control valve 39 is returned to its neutral position so that channel 41 is open to gear pump pressure and channel 42 is open to drain, liquid from gear pump 27 will flow through channel 28, port 55, bore 48 and port 56 to cylinder 46 and cause piston 45 to move slide block 5 and valve 51 toward the right until valve piston 53 aligns with land 57 as shown in Fig. 3 and then the liquid will bypass around valve 51 from port 55 through channel 64, check valve 62 and channel 61 to port 54 in bore 48 so that slide block 5 is moved at high speed until stopped in its neutral position by piston 33.

Figure 4:
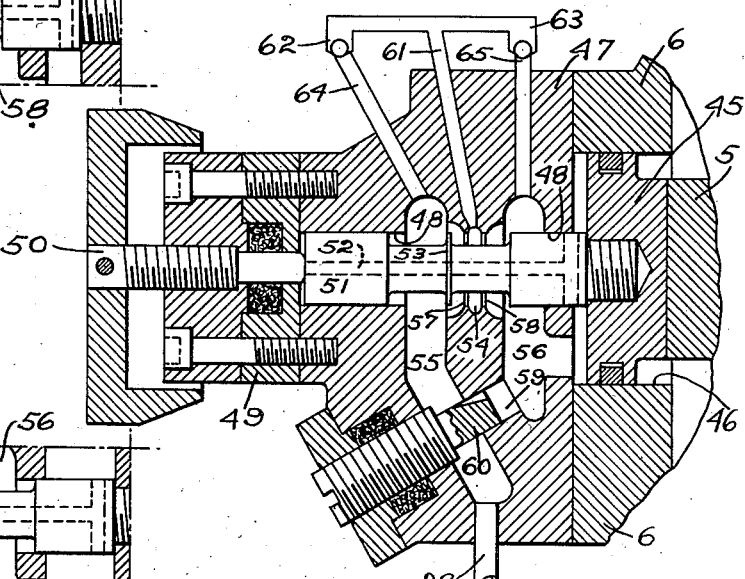
Fig. 4 is a view similar to Fig. 3 but with the valve shown in the position occupied when the pump is delivering liquid at a predetermined maximum rate in the opposite direction.
Figure 4:
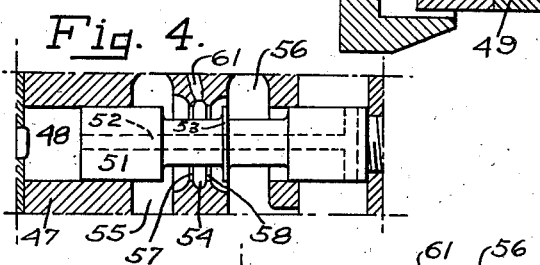
Figure 5:
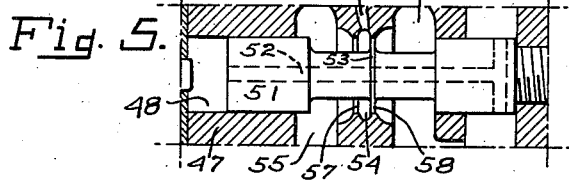
Fig. 5 is a view similar to Fig. 3 but showing the valve in a position intermediate the positions shown in Figs. 1 and 4.

When slide block 5 is in its neutral position and control valve 39 is shifted to a position to connect channels 41 and 42 to drain channel 40, liquid from gear pump 27 will flow through channel 28, port 55, bore 48 and port 56 to cylinder 46 and cause piston 45 to move slide block 5 and valve 51 toward the right at a very high speed until valve piston 53 aligns with land 58 as shown in Fig. 5 and then the liquid will flow through passage 59 at a very low rate as determined by the adjustment of throttle valve 60 and cause piston 45 to move slide block 5 toward the right at a very slow speed as long as piston 53 remains in alignment with land 58. As soon as piston 53 moves beyond land 58 as shown in Fig. 4, liquid may flow freely through bore 48 and cause piston 45 to again move slide block 5 toward the right at a very high speed until it moves stop rod 36 against adjusting screw 35 which is adjusted to stop slide block 5 when the rate at which pump 1 is discharging liquid into channel 7 reaches a predetermined maximum.

When slide block 5 is at the limit of its movement toward the right as indicated by the position of valve 51 in Fig. 4 and control valve 39 is returned to its neutral position so that channel 41 is opened to gear pump pressure, liquid from gear pump 27 will flow therethrough to cylinder 30 and cause piston 33 to shift slide block 5 toward the left and piston 45 to expel liquid from cylinder 46. Slide block 5 will move at a very high rate of speed and liquid will flow freely from cylinder 46 through port 56, bore 48 and port 55 into channel 28 until valve piston 53 blocks the flow of liquid through bore 48 by moving into alignment with land 58 as shown in Fig. 5 and then the liquid will bypass around piston 51 from port 56 through channel 65, check valve 63 and channel 61 to port 54 in bore 48 so that slide block 5 is moved at high speed until piston 33 is stopped by collar 38 on rod 36 at which time slide block 5 is in its neutral position and further movement thereof toward the left is prevented due to piston 45 being continuously subjected to gear pump pressure.

The arrangement is such that movement of valve 39 from its neutral position to one of its other two positions causes slide block 5 to be suddenly shifted a predetermined distance in one direction or the other, then delayed for a brief period of time and then suddenly shifted to a predetermined limit so that pump 1 is caused to deliver liquid at a predetermined rate, that rate maintained nearly constant for a brief period of time and then suddenly increased to a predetermined maximum.

The control thus enables a motor to operate at a given speed for a given period of time and then automatically increase its speed to a predetermined maximum, and it enables a pump to either drive a motor at a given speed for a given period of time and then automatically accelerate the motor to a predetermined maximum speed or to drive one motor at a desired speed and then drive a second motor at a desired speed.

For example, the work slide and the tool slide of a certain type of broaching machine are operated in sequence by a small motor and a large motor. The invention enables a pump to at first deliver liquid at a rate suitable for driving the work slide motor, to maintain that rate until the work slide completes its stroke, and to then increase its delivery to a rate suitable for driving the tool slide motor.

The control is adapted for various other uses and it may be modified in various ways without departing from the scope of the invention which is hereby claimed as follows.

I claim:

1. In a hydrodynamic machine having a displacement varying member shiftable between zero and maximum displacement positions, the combination of means for moving said member from its zero displacement position to a maximum displacement position and tending to move it at high speed, means effective only at a point between said positions for interrupting the rapid movement of said member, and means for modifying the effect of said interrupting means to enable said moving means to move said member at slow speed past said point whereby the displacement of said machine is suddenly increased a predetermined amount and then maintained nearly constant for a predetermined period of time and then suddenly increased to a predetermined maximum.

2. In a hydrodynamic machine having a displacement varying member shiftable between zero and maximum displacement positions, the combination of means for moving said member from its zero displacement position to a maximum displacement position and tending to move it at high speed, means effective only at a point between said positions for interrupting the rapid movement of said member, means for modifying the effect of said interrupting means to enable said moving means to move said member at slow speed past said point whereby the displacement of said machine is suddenly increased a predetermined amount and then maintained nearly constant for a predetermined period of time and then suddenly increased to a predetermined maximum, means for moving said member to its zero displacement position, and means for preventing said interrupting means from interrupting the movement of said member toward its zero displacement position.

3. In a hydrodynamic machine having a displacement varying member shiftable between zero and maximum displacement positions, the combination of means for moving said member from its zero displacement position to a maximum displacement position and tending to move it at high speed, means effective only at a point between said positions for interrupting the rapid movement of said member, means for modifying the effect of said interrupting means to enable said moving means to move said member at slow speed past said point whereby the displacement of said machine is suddenly increased a predetermined amount and then maintained nearly constant for a predetermined period of time and then suddenly increased to a predetermined maximum, and means for varying the speed of said member past said point to thereby vary the period of time during which the displacement of said machine is maintained nearly constant.

4. In a hydrodynamic machine having a displacement varying member shiftable between zero and maximum displacement positions, the combination of means for moving said member from its zero displacement position to a maximum displacement position and tending to move it at high speed, means effective only at a point between said positions for interrupting the rapid movement of said member, means for modifying the effect of said interrupting means to enable said moving means to move said member at slow speed past said point whereby the displacement of said machine is suddenly increased a predetermined amount and then maintained nearly constant for a predetermined period of time and then suddenly increased to a predetermined maximum, means for varying the speed of said member past said point to thereby vary the period of time during which the displacement of said machine is maintained nearly constant, means for moving said member to its zero displacement position, and means for preventing said interrupting means from interrupting the movement of said member toward its zero displacement position.

5. In a hydrodynamic machine having a displacement varying member shiftable between zero and maximum displacement positions, the combination of means for moving said member from its zero displacement position to a maximum displacement position and tending to move it at high speed, hydraulic means for resisting the movement of said member toward its maximum displacement position, means including a channel for supplying liquid to said hydraulic means, a valve movable with said member for controlling said channel and adapted to close the same and interrupt the discharge of liquid therethrough from said hydraulic means when said member reaches a given point between said positions, and means for bypassing liquid around said valve at a limited rate to enable said moving means to move said member at slow speed past said point and thereby cause said valve to open said channel whereby the displacement of said machine is suddenly increased a predetermined amount and then maintained nearly constant for a predetermined period of time and then suddenly increased to a predetermined maximum.

6. In a hydrodynamic machine having a displacement varying member shiftable between zero and maximum displacement positions, the combination of means for moving said member from its zero displacement position to a maximum displacement position and tending to move it at high speed, hydraulic means for resisting the movement of said member toward its maximum displacement position, means including a channel for supplying liquid to said hydraulic means, a valve movable with said member for controlling said channel and adapted to close the same and interrupt the discharge of liquid therethrough from said hydraulic means when said member reaches a given point between said positions, means for bypassing liquid around said valve at a limited rate to enable said moving means to move said member at slow speed past said point and thereby cause said valve to open said channel whereby the displacement of said machine is suddenly increased a predetermined amount and then maintained nearly constant for a predetermined period of time and then suddenly increased to a predetermined maximum, and means for varying the rate at which liquid is bypassed around said valve to thereby vary the period of time during which the displacement of said machine is maintained nearly constant.

7. In a hydrodynamic machine having a displacement varying member shiftable between zero and maximum displacement positions, the combination of means for moving said member from its zero displacement position to a maximum displacement position and tending to move it at high speed, a stationary cylinder, a piston fitted in said cylinder and movable with said member, means including a channel for supplying liquid to said cylinder at a uniform pressure, a valve movable with said member for controlling said channel and adapted to close the same and interrupt the discharge of liquid therethrough from said hydraulic means when said member reaches a given point between said positions, means for bypassing liquid around said valve at a limited rate to enable said moving means to move said member at slow speed past said point and thereby cause said valve to open said channel whereby the displacement of said machine is suddenly increased a predetermined amount and then maintained nearly constant for a predetermined period of time and then suddenly increased to a predetermined maximum, said piston being adapted to move said member to its zero displacement position in response to said moving means being deenergized, and means for bypassing liquid freely around said valve during movement of said member toward its zero displacement position.

8. In a hydrodynamic machine having a displacement varying member shiftable between zero and maximum displacement positions, the combination of means for moving said member from its zero displacement position to a maximum displacement position and tending to move it at high speed, a stationary cylinder, a piston fitted in said cylinder and movable with said member, means including a channel for supplying liquid to said cylinder at a uniform pressure, a valve movable with said member for controlling said channel and adapted to close the same and interrupt the discharge of liquid therethrough from said hydraulic means when said member reaches a given point between said positions, means for bypassing liquid around said valve at a limited rate to enable said moving means to move said member at slow speed past said point and thereby cause said valve to open said channel whereby the displacement of said machine is suddenly increased a predetermined amount and then maintained nearly constant for a predetermined period of time and then suddenly increased to a predetermined maximum, said piston being adapted to move said member to its zero displacement position in response to said moving means being deenergized, means for bypassing liquid freely around said valve during movement of said member toward its zero displacement position, and means for varying the rate at which liquid is bypassed around said valve to thereby vary the period of time during which the displacement of said machine is maintained nearly constant.

9. In a hydrodynamic machine having a displacement varying member shiftable between zero and maximum displacement positions, the combination of means for moving said member from its zero displacement position to a maximum displacement position and tending to move it at high speed, a stationary cylinder, means including a channel for supplying liquid to said cylinder at a uniform pressure, a piston fitted in said cylinder and adapted to move with said member and eject liquid from said cylinder through said channel, a valve plunger arranged in said channel and movable with said member, an annular valve seat formed upon the wall of said channel, an annular valve arranged upon said plunger to coact with said valve seat and close said channel when said member reaches a given point between said positions, and means for bypassing liquid around said valve at a limited rate to enable said moving means to move said member at slow speed past said point and thereby cause said valve to open said channel whereby the displacement of said machine is suddenly increased a predetermined amount and then maintained nearly constant for a predetermined period of time and then suddenly increased to a predetermined maximum.

10. In a hydrodynamic machine having a displacement varying member shiftable between zero and maximum displacement positions, the combination of means for moving said member from its zero displacement position to a maximum displacement position and tending to move it at high speed, a stationary cylinder, means including a channel for supplying liquid to said cylinder at a uniform pressure, a piston fitted in said cylinder and adapted to move with said member and eject liquid from said cylinder through said channel, a valve plunger arranged in said channel and movable with said member, an annular valve seat formed upon the wall of said channel, an annular valve arranged upon said plunger to coact with said valve seat and close said channel when said member reaches a given point between said positions, means for bypassing liquid around said valve at a limited rate to enable said moving means to move said member at slow speed past said point and thereby cause said valve to open said channel whereby the displacement of said machine is suddenly increased a predetermined amount and then maintained nearly constant for a predetermined period of time and then suddenly increased to a predetermined maximum, said piston being adapted to move said member to its zero displacement position in response to said moving means being deenergized, and means for bypassing liquid freely around said valve during movement of said member toward its zero displacement position.

11. In a hydrodynamic machine having a displacement varying member shiftable in opposite directions from a zero displacement position to one or the other of two maximum displacement positions, the combination of means for moving said member in each of said directions and tending to move it at high speed, means effective at only one or the other of two points for interrupting the rapid movement of said member in one or the other of said directions, and means for modifying the effect of said interrupting means to enable said moving means to move said member at slow speed past either of said points whereby the displacement of said machine is suddenly increased a predetermined amount and then maintained nearly constant for a predetermined period of time and then suddenly increased to a predetermined maximum during movement of said member in either direction.

12. In a hydrodynamic machine having a displacement varying member shiftable in opposite directions from a zero displacement position to one or the other of two maximum displacement positions, the combination of means for moving said member in each of said directions and tending to move it at high speed, means effective at only one or the other of two points for interrupting the rapid movement of said member in one or the other of said directions, means for modifying the effect of said interrupting means to enable said moving means to move said member at slow speed past either of said points whereby the displacement of said machine is suddenly increased a predetermined amount and then maintained nearly constant for a predetermined period of time and then suddenly increased to a predetermined maximum during movement of said member in either direction, and means for preventing said interrupting means from interrupting the movement of said member from a maximum displacement position to its zero displacement position.

13. In a hydrodynamic machine having a displacement varying member shiftable in opposite directions from a zero displacement position to one or the other of two maximum displacement positions, the combination of means for moving said member in each of said directions and tending to move it at high speed, means effective at only one or the other of two points for interrupting the rapid movement of said member in one or the other of said directions, means for modifying the effect of said interrupting means to enable said moving means to move said member at slow speed past either of said points whereby the displacement of said machine is suddenly increased a predetermined amount and then maintained nearly constant for a predetermined period of time and then suddenly increased to a predetermined maximum during movement of said member in either direction, and means for varying the speed of said member past either of said points to thereby vary the period of time during which the displacement of said machine is maintained nearly constant.

14. In a hydrodynamic machine having a displacement varying member shiftable in opposite directions from a zero displacement position to one or the other of two maximum displacement positions, the combination of means for moving said member in each of said directions and tending to move it at high speed, means effective at only one or the other of two points for interrupting the rapid movement of said member in one or the other of said directions, means for modifying the effect of said interrupting means to enable said moving means to move said member at slow speed past either of said points whereby the displacement of said machine is suddenly increased a predetermined amount and then maintained nearly constant for a predetermined period of time and then suddenly increased to a predetermined maximum during movement of said member in either direction, means for varying the speed of said member past either of said points to thereby vary the period of time during which the displacement of said machine is maintained nearly constant, and means for preventing said interrupting means from interrupting the movement of said member from a maximum displacement position to its zero displacement position.

15. In a hydrodynamic machine having a displacement varying member shiftable in opposite directions from a zero displacement position to one or the other of two maximum displacement positions, the combination of means for moving said member in one direction and tending to move it at high speed, means for energizing and deenergizing said moving means, a stationary cylinder, a piston fitted in said cylinder and movable with said member, means including a channel for supplying liquid to said cylinder at a uniform pressure to cause said piston to expel liquid from said cylinder through said channel when said member is moved in said direction by said moving means and to enable said piston to move said member in the opposite direction at high speed when said moving means is deenergized, valve means movable with said member and so positioned within said channel as to close it and thereby interrupt the rapid movement of said member when said member reaches a predetermined point on one side or the other of its zero displacement position, and means for bypassing liquid around said valve means at a limited rate to enable said moving means or said piston to move said member at slow speed past one or the other of said points and thereby cause said valve to open said channel whereby the displacement of said machine is suddenly increased a predetermined amount and then maintained nearly constant for a predetermined period of time and then suddenly increased to a predetermined maximum.

16. In a hydrodynamic machine having a displacement varying member shiftable in opposite directions from a zero displacement position to one or the other of two maximum displacement positions, the combination of means for moving said member in one direction and tending to move it at high speed, means for energizing and deenergizing said moving means, a stationary cylinder, a piston fitted in said cylinder and movable with said member, means including a channel for supplying liquid to said cylinder at a uniform pressure to cause said piston to expel liquid from said cylinder through said channel when said member is moved in said direction by said moving means and to enable said piston to move said member in the opposite direction at high speed when said moving means is deenergized, valve means movable with said member and so positioned within said channel as to close it and thereby interrupt the rapid movement of said member when said member reaches a predetermined point on one side or the other of its zero displacement position, means for bypassing liquid around said valve means at a limited rate to enable said moving means or said piston to move said member at slow speed past one or the other of said points and thereby cause said valve to open said channel whereby the displacement of said machine is suddenly increased a predetermined amount and then maintained nearly constant for a predetermined period of time and then suddenly increased to a predetermined maximum, and means for bypassing liquid freely around said valve during movement of said member from either of its maximum displacement positions to its zero displacement position.

17. In a hydrodynamic machine having a displacement varying member shiftable in opposite directions from a zero displacement position to one or the other of two maximum displacement positions, the combination of means for moving said member in one direction and tending to move it at high speed, means for energizing and deenergizing said moving means, a stationary cylinder, a piston fitted in said cylinder and movable with said member, means including a channel for supplying liquid to said cylinder at a uniform pressure to cause said piston to expel liquid from said cylinder through said channel when said member is moved in said direction by said moving means and to enable said piston to move said member in the opposite direction at high speed when said moving means is deenergized, valve means movable with said member and so positioned within said channel as to close it and thereby interrupt the rapid movement of said member when said member reaches a predetermined point on one side or the other of its zero displacement position, means for bypassing liquid around said valve means at a limited rate to enable said moving means or said piston to move said member at slow speed past one or the other of said points and thereby cause said valve to open said channel whereby the displacement of said machine is suddenly increased a predetermined amount and then maintained nearly constant for a predetermined period of time and then suddenly increased to a predetermined maximum, and means for varying the speed of said member past either of said points to thereby vary the period of time during which the displacement of said machine is maintained nearly constant.

18. In a hydrodynamic machine having a displacement varying member shiftable in opposite directions from a zero displacement position to one or the other of two maximum displacement positions, the combination of means for moving said member in one direction and tending to move it at high speed, means for energizing and deenergizing said moving means, a stationary cylinder, a piston fitted in said cylinder and movable with said member, means including a channel for supplying liquid to said cylinder at a uniform pressure to cause said piston to expel liquid from said cylinder through said channel when said member is moved in said direction by said moving means and to enable said piston to move said member in the opposite direction at high speed when said moving means is deenergized, valve means movable with said member and so positioned within said channel as to close it and thereby interrupt the rapid movement of said member when said member reaches a predetermined point on one side or the other of its zero displacement position, means for bypassing liquid around said valve means at a limited rate to enable said moving means or said piston to move said member at slow speed past one or the other of said points and thereby cause said valve to open said channel whereby the displacement of said machine is suddenly increased a predetermined amount and then maintained nearly constant for a predetermined period of time and then suddenly increased to a predetermined maximum, means for varying the speed of said member past either of said points to thereby vary the period of time during which the displacement of said machine is maintained nearly constant, and means for bypassing liquid freely around said valve during movement of said member from either of its maximum displacement positions to its zero displacement position.

RICHARD E. DAVIS.